United States Patent
Murthy et al.

(10) Patent No.: US 6,685,834 B1
(45) Date of Patent: Feb. 3, 2004

(54) METHOD FOR CONDITIONING AND DEWATERING THERMOPHILIC AEROBICALLY DIGESTED BIOSOLIDS

(75) Inventors: Sudhir N. Murthy, Reston, VA (US); R. David Holbrook, Blacksburg, VA (US); John T. Novak, Blacksburg, VA (US); Sun-Nan Hong, Cary, NC (US)

(73) Assignee: Kruger, Inc., Cary, NC (US)

( * ) Notice: Subject to any disclaimer, the term of this patent is extended or adjusted under 35 U.S.C. 154(b) by 0 days.

(21) Appl. No.: 09/467,814

(22) Filed: Dec. 20, 1999

(51) Int. Cl.$^7$ .................................................. C02F 3/00
(52) U.S. Cl. ...................... 210/613; 210/631; 210/727
(58) Field of Search .......................... 210/609, 612, 210/613, 620–623, 723, 727, 732, 733, 631

(56) References Cited

U.S. PATENT DOCUMENTS

| | | | | |
|---|---|---|---|---|
| 4,559,146 A | * | 12/1985 | Roets | |
| 4,983,298 A | * | 1/1991 | Fuchs et al. | 210/613 |
| 5,540,839 A | * | 7/1996 | Pirt | 210/605 |
| 5,558,774 A | * | 9/1996 | Tonelli | |
| 5,766,331 A | * | 6/1998 | Krinski | |
| 5,906,746 A | * | 5/1999 | Helmo et al. | 210/614 |
| 5,906,750 A | * | 5/1999 | Haase | 210/727 |
| 5,954,964 A | * | 9/1999 | Nielsen et al. | |
| 5,981,270 A | * | 11/1999 | Roberts et al. | 366/220 |
| 6,083,404 A | * | 7/2000 | Sommese | |
| 6,117,203 A | * | 9/2000 | Buchhave et al. | 71/12 |
| 6,168,717 B1 | * | 1/2001 | Pressley et al. | 210/608 |

FOREIGN PATENT DOCUMENTS

EP           78919 A1   *   5/1983

* cited by examiner

*Primary Examiner*—Chester T. Barry
(74) *Attorney, Agent, or Firm*—Coats & Bennett, PLLC

(57) ABSTRACT

A Method of treating sludge prior to dewatering by mixing with the sludge a cationic metal in the form of an iron or aluminum slat along with a cationic polymer. The addition of the iron or aluminum salt substantially reduces the amount of polymer required for acceptable dewatering, thusly significantly reducing the cost of the dewatering process. The method is enhanced by subjecting the prior digested sludge to mesophilic aeration prior to the cationic metal salt and polymer being added.

13 Claims, 1 Drawing Sheet

METHOD FOR CONDITIONING AND DEWATERING THERMOPHILIC AEROBICALLY DIGESTED BIOSOLIDS

FIELD OF THE INVENTION

The present invention relates to wastewater treatment systems and, more particularly to a process that includes pretreating digested sludge so as to increase the efficiency of sludge dewatering and to produce a relatively clean dewatered sludge that can be economically transported.

BACKGROUND OF THE INVENTION

Activated sludge systems are widely used throughout the world to treat wastewater, with the intent of significantly reducing the concentrations of certain nitrogen and phosphorous containing compounds as well as generally reducing BOD levels within the wastewater. See, for example, U.S. Re. Pat. Nos. 32,429 and 4,874,519, the disclosures of which are expressly incorporated herein by reference.

Activated sludge systems of the type contemplated herein typically receive a stream of raw wastewater influent which is directed through a sequence or series of treatment stages. These treatment stages typically include aerobic, anaerobic, and/or anoxic processes. Upon completion of these treatment stages, the processed wastewater stream is passed to a final clarifier stage where the residual solid sludge particulate matter is physically separated and removed from the wastewater. The resulting purified effluent may then be discharged into a lake or stream, while a portion of the sludge that has been isolated by the final clarifier is returned or recycled to the head of the activated sludge system. The residual or non-recycled portion of sludge, which is often referred to as waste activated sludge (WAS), is typically directed from the final clarifier for disposal as an agricultural resource, such as a fertilizer or soil additive.

However, prior to release or distribution as an agricultural fertilizer, all contaminants must first be removed or separated from the WAS as well as other sludge produced during the waste water treatment process. Therefore, in a typical activated sludge system or process, the WAS component of the waste material stream as well as other sludge, such as primary, is directed to a digester where the sludge is further treated and cleaned by removing various pathogens and organic matter or volatile elements.

With particular regard to the digestion process cited above, there are a variety of sanitary levels or degrees that can be achieved through the use of such treatment processes. For example, some wastewater treatment facilities require a very clean grade of sludge product, so that the material may be disposed on agricultural fields or in sanitary landfills. Such digested sludge material is often referred to as Class A sludge. It should be noted, however, that there are other lower grades or classes of sludge which are not as clean or pure as a Class A sludge product. One type of digester, currently in wide commercial use, is an auto thermal thermophilic aerobic digestion system (ATAD). In this process, the incoming waste activated sludge is subjected to a mechanical thickening process and then stored in a holding tank for eventual metering to and processing by the ATAD system. The ATAD system typically consists of one to three serially-connected reactors in which the sludge undergoes an aerobic digestion process.

In general, the relative water content of the final sludge product varies depending upon the desired end use or disposal method. The sludge material stored in a post-ATAD holding tank typically contains a significant amount of water and is often used for such applications as roadside watering. However, if the sludge product is to be used as a fertilizer or soil additive, a reduction in water content is generally desirable so as to reduce the costs associated with transporting the waste material from the treatment facility to the agricultural site. Such a water content reduction is typically achieved via a post ATAD dewatering process, so as to produce a more concentrated final sludge product. Following dewatering processing, the concentrated sludge product assumes the consistency of a damp soil which may be efficiently transported and effectively used as a fertilizer on agricultural fields or safely disposed of in a solid waste landfill.

Dewatering of the digested sludge or treated biosolids material is currently accomplished through the use of mechanical means, such as a centrifuge for example. Typically, polymer additives are used in conjunction with such centrifugal dewatering devices to facilitate and expedite flocculation of the suspended biosolids. Such polymer additives are able to produce the desired flocculating effect as a consequence of the fact that the solid or particulate component of the treated wastewater solution is generally of an anionic nature, while the polymer additive exhibits a multivalent, cationic character. Thus, once introduced into the treated wastewater solution, each multivalent cationic polymer molecule will typically bond to several neighboring anionic biosolid particles, and as a consequence will effectively cause the biosolids component of the sludge to floc or aggregate together into physically larger particles. In general, such enlarged particle aggregations of flocs are easier to isolate and separate from the wastewater solution when using centrifugal dewatering techniques. It should also be noted that bonding of the sludge with the polymer agent, has the added benefit of generally driving water out of the resulting flocs thereby promoting the dewatering process.

It will be appreciated that a typical volume of wastewater will naturally contain small quantities of a number of multivalent cations, such as $Ca^{+2}$ and $Mg^{+2}$, which will tend to induce the same flocculating effects as the synthetic polymer additive. However, there are also typically small quantities of monovalent cations, such as $NH_4^{+1}$ (ammonia nitrogen), present in the wastewater which tend to compete with the floc inducing multivalent cations for binding sites present on the anionic biosolid particulates. Being monovalent, these cations are not able to effectively bind to multiple biosolid particles simultaneously, and hence do not facilitate flocculation of the biosolids material. Therefore, it will be appreciated that the presence of monovalent cations in the wastewater solution tends to reduce the overall efficiency and effectiveness of the flocculating polymer additives.

An additional inefficiency, with regard to the use of flocculating polymer additives, involves the inherent presence of protein and polysaccharides compounds as well as COD in the wastewater solution. These naturally occurring, organic compounds tend to interact or react with the flocculating polymers in such a manner so as to effectively neutralize or significantly reduce the polymer's floc inducing qualities.

Obviously, reducing or minimizing the impact of these factors which compete with or diminish the effectiveness of flocculating polymers with tend to increase the overall cost effectiveness of the dewatering process. Therefor, with particular regard to dewatering processes which utilize flocculating polymer additives, there is and continues to be a need for a method of reducing the competing and generally disruptive effects of monovalent cations, proteins, and polysaccharides compounds typically found in the waste water solution.

SUMMARY OF THE INVENTION

The present invention entails a method of conditioning and dewatering thermophilic aerobically digested sludge. Prior to dewatering, iron or aluminum along with a cationic polymer is mixed with the digested sludge. The addition of the iron or aluminum significantly reduces the polymer demand for acceptable dewatering and consequently reduces the overall cost of the dewatering process. In one embodiment, the iron or aluminum is added in the form of a salt such as ferric chloride or aluminum. In one embodiment of the present invention, the digested sludge is subjected to mesophilic aeration prior to being treated with iron or aluminum. The aeration of the sludge acts to nitrify the ammonia nitrogen found within the sludge and evidence suggests that the aeration decrease the protein concentration in the sludge. As will be appreciated from subsequent portions of this disclosure, ammonia nitrogen and protein tend to increase the polymer demand for acceptable dewatering. Thus by nitrifying the ammonia nitrogen and reducing the protein concentration, the dewatering characteristics of the sludge is enhanced.

It is therefore an object of the present invention to provide a sludge conditioning process that will reduce cationic polymer demand for dewatering autothermal thermophilic aerobic digested sludge

DESCRIPTION OF THE INVENTION

Figure 1:
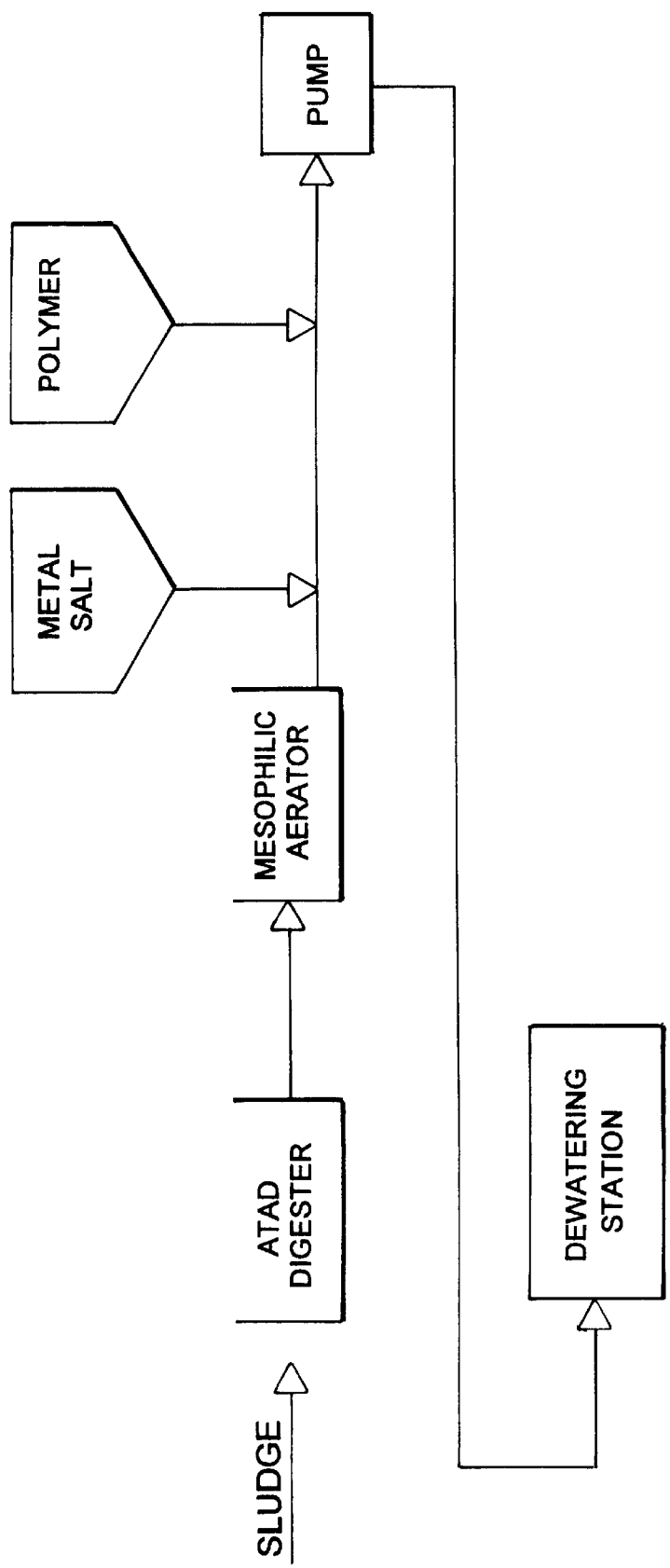
FIG. 1 is a schematic illustration showing the basic process for conditioning sludge to improve its dewatering capabilities.

There are numerous processes for digesting sludge. One such process is referred to as autothermal thermophilic aerobic digestion (ATAD). In the ATAD process, where detention times range from 6–12 days, biosolids are stabilized at elevated temperatures of between 50–70° C. The process uses oxygen to accelerate volatile solids destruction under thermophilic conditions and pathogen reduction at the high temperatures. ATAD processes are generally autothermal because heat is produced by endogenous microbial metabolism of biosolids during the digestion process.

In ATAD processes, a combination of temperature and detention time (degrees C x days or ° C.-day product) has been used to estimate volatile solids reduction and pathogen destruction. A 400° C.-day product has been recommended to achieve 38% volatile solids destruction by the United States Environmental Protection Agency. However, it should be noted that pathogen destruction could be achieved at a lower ° C.-day product. Therefore, it is generally accepted that a higher ° C.-day product will result in a safer sludge, that is a more stable sludge with a substantial reduction in pathogen concentration.

While a higher ° C.-day sludge product may provide a safer sludge; it is believed that these higher ° C.-day products have a negative impact on the dewatering capability of the sludge. In short, tests indicate that there is a strong correlation between the ° C.-day product of an ATAD digestion system and the polymer demand for acceptable dewatering. That is, the higher the ° C.-day product in ATAD reactors, the higher the polymer demands for acceptable conditioning.

It is postulated that the relatively high polymer demand for unconditioned ATAD sludge is a attributable to high concentrations of COD found in the sludge which may arise because of the particular nature of the ATAD process. Some theories for the increased levels of COD that are found in ATAD processes include the inability of bacteria to produce the enzymes necessary for degradation of these compounds, or the denaturation of the compounds themselves at high temperatures. Mostly the COD is made up of organic macromolecules, that is protein and polysaccharides. It is believed that protein and polysaccharides found in sludge are anionic, i.e. negatively charged. Since the protein and polysaccharides are negatively charged they tend to combine with or attract the cationic polymer or polymers that are traditionally added to facilitate flocculation and dewatering. It thusly follows that the combining of the protein and polysaccharides with the cationic polymer or polymers interferes with the ability of the polymer or polymers to efficiently dewater the ATAD sludge.

In view of the above, the process of the present invention is directed at minimizing the adverse effects that COD, protein and polysaccharides have on dewatering ATAD sludge. Thus the focus of the process was to discover a conditioning process that would somehow neutralize or drive the COD, protein and polysaccharides from solution. In a series of tests, it was discovered that the use of a metal salt in combination with a cationic polymer would effectively condition ATAD sludge such that it could be dewatered efficiently and at an effective cost. Basically it was discovered that use of iron or aluminum would cause portions of the COD, protein and polysaccharides to be driven from solution and thus would not interfere with the effectiveness of a cationic polymer.

In one test, ferric chloride was added to sludge at the rate of 0.10 lb. Fe/lb. dry solids. The result of that test is summarized in Table I below.

TABLE I

Polymer Demand and COD concentration for Acceptable Flocculation with and without Ferric Chloride Addition

| Sample Location | Polymer Demand (no iron) (lbs./dry ton) | Polymer Demand (with iron) (lbs./dry ton) | Initial COD (mg/L) | Filtrate COD (with iron) (mg/L) |
|---|---|---|---|---|
| ATAD Reactor 1 | 16 | — | 7100 | — |
| ATAD Reactor 2 | 39 | — | 8400 | — |
| ATAD Reactor 3 | 108 | 26 | 8600 | 4000 |
| Holding Tank 1 | 96 | 6 | 3700 | 1100 |
| Holding Tank 2 | 66 | 2 | 3500 | 850 |

Table I shows that the polymer demand increases from ATAD reactor 1 to ATAD reactor 3 and then decreases from ATAD reactor 3 to Holding Tank 2. This simply verifies that polymer demand increases as temperature increases and decreases as the temperature decreases. In similar fashion, the COD concentrations increase with temperature and detention time in the ATAD reactors, and decrease once the sludge reaches and moves through the holding tanks.

As indicated above, there was a significant reduction in polymer demand with the addition of ferric chloride. This polymer reduction ranged from 66–97 % with a corresponding reduction in filtrate COD between 53% and 75% when compared with the initial concentration of COD. The addition of ferric chloride resulted in the coagulation of these organics and their subsequent removal from solution. Similar improvements in reduced polymer demand were observed when alum was used in the place of ferric chloride as the initial conditioner. Further, tests have indicated that similar results would be achieved by utilizing ferrous chloride.

With reference to FIG. 1, it is seen that sludge is directed into the ATAD digester. As indicated above, the sludge therein is subjected to autothermal thermophilic aerobic digestion for a period of approximately 6–12 days at a temperature range of 50–70° C. This ATAD digestion process can be carried out in one or more reactors.

Once the sludge is digested, it is directed into a mesophilic aerator where the sludge undergoes mesophilic aeration. Typically, this process has a detention time of approximately 10–15 days and is carried out at a temperature of approximately 20–40° C. Typically air is supplied to the mesophilic aerator directly or is essentially generated by an internal mixer. In short, the digested sludge is aerated continuously and as such any ammonia nitrogen contained within the sludge will be nitrified. Essentially the ammonia nitrogen, $NH_4$, is converted to nitrate or nitrite. Because ammonia nitrogen is a monovalent cation, it also has the tendency to increase polymer demand for acceptable dewatering. Thus by nitrifying the ammonia nitrogen, the total polymer demand maybe further reduced. Moreover, post digestion aeration may have other benefits. It is postulated that the aerobic treatment following digestion may itself contribute to the degradation of the COD and particularly the protein component of COD. Acceptable dewatering as used herein means that 95 percent or more of the solids are captured and that the cake solids have a solids content of 18 percent or more by weight.

In the embodiment illustrated in FIG. 1, the holding tank downstream from the ATAD digester is a mesophilic aerator. However, it should be understood that the process described herein could include one or more anaerobic holding tanks located downstream from the ATAD digester.

In any event, after the sludge has been subjected to mesophilic aeration or other cooling treatment, then the metal salt is added and mixed with the sludge along with a cationic polymer. As indicated above, the metal salt would be either an iron salt or an aluminum salt such as ferric chloride or alum. In terms of the polymer use, there are numerous commercially available polymers for dewatering sludge. In many cases a high molecular weight cationic polymer is preferred. Acceptable polymers for use in dewatering processes of the type disclosed herein are Nalco 9909 or Nalco PL250. The amount of conditioning product, the metal salt and cationic polymer can vary depending on the particular application. It is contemplated that the metal salt would be added in amount equal to approximately 0.02–0.20 lb. of iron or equivalent aluminum per pound of solids. The polymer feed rate on the other hand would typically be on the order of 15 to 25 lbs. per dry ton of solids. As seen in FIG. 1, both the metal salt and the polymer are added after aeration but before the pump that directs the conditioned sludge to the dewatering station. However, it should be pointed out that it has been found to be effective to divide the infeed of the polymer to the sludge to where approximately 50 percent of the polymer is added prior to the pump and 50 percent of the polymer is added downstream from the pump.

Table II appearing below shows the data and conditioning parameters for three separate wastewater treatment facilities that utilized the dewatering process of the present invention. All three facilities are designed to digest and dewater sludge.

TABLE II

| | | Facility 1 | Facility 2 | Facility 3 |
|---|---|---|---|---|
| Current Influent Flow (MGD) | | 4.2 | 1.8 | 1.3 |
| Activated Sludge Process | | Plug Flow | Oxidation Ditch | Oxidation Ditch |
| HRT (hours) | | 8 | 24 | 18 |
| SRT (days) | | 8–12 | 20–30 | 15–20 |
| Number of ATAD Reactors in Operation | | 3 | 1 | 2 |
| HRT (days) | | 6–8 | 10 | 18–20 |
| Average Reactor Temp. (C) | | | | |
| Reactor 1 | | 35 | 56 | 56 |
| Reactor 2 | | 45 | — | 45 |
| Reactor 3 | | 58 | — | — |
| Post-Digestion Holding | | Aerobic | Anaerobic | Anaerobic |
| HRT (days) | | 25 | 30 | 15 |
| Dewatering Method | | Centrifuge | Belt Filter Press | Belt Filter Press |
| Sludge Feed Rate | (gpm) | 64 | 125 | 58 |
| Feed Solids Conc. | (%) | 2.9 | 2.9 | 3 |
| Feed Solids Rate | (dry tons/hr) | 0.46 | 0.84 | 0.44 |
| Coagulant Feed | (gpm) | 0.113 | 0.36 | 0.15 |
| Polymer Feed Rate | (gpm) | 5 | 4.1 | 0.42 |
| Coagulant Feed | (lbs Fe/lb solid) | 0.04 | 0.02 | 0.06 |
| Polymer Feed Rate | (lbs/dry ton) | 22 | 20 | 19 |
| Coagulant Cost | ($/dry ton) | 9.75 | 5.80 | 12.70 |
| Polymer Cost | ($/dry ton) | 49.50 | 39.60 | 31.00 |
| Total Cost | ($/dry ton) | 59.25 | 45.40 | 43.70 |

As seen in Table II, facility 1 includes three ATAD reactors and a post-digestion aerobic holding tank. This particular facility utilizes alum (coagulant) along with a cationic polymer. The equivalent iron feed rate for the alum is 0.04 lbs. Fe/lb. solid. As seen in Table II, the total dewatering cost based on the alum and polymer cost is $59.25 per dry ton of solids.

Facility 2 utilizes a single ATAD reactor and a following anaerobic holding tank. The coagulant feed for the metal salt in this case is ferrous chloride. Note that the feed rate of the ferrous chloride is 0.02 lbs. Fe/lb. solid. This resulted in a total coagulant and polymer cost of $45.40 per dry ton of solids.

Facility utilizes two ATAD reactors and a following anaerobic holding tank. The coagulant feed for the metal salt used is ferric chloride. The ferric chloride is mixed with the sludge at the rate of 0.06 lbs. Fe/lb. solid. This yielded a total coagulant and polymer costs of $43.70 per dry ton of solids.

From the foregoing specification and discussion it is appreciated that the present invention greatly increases the dewatering efficiency for ATAD sludge. By mixing a metal salt such as ferric chloride or alum, COD and particularly protein and polysaccharides are driven from the solution such that they do not adversely interfere with the dewatering performance of one or more cationic polymers added. In the end, the cost of dewatering the ATAD sludge is substantially reduced.

What is claimed is:

1. A method for digesting, conditioning and dewatering sludge comprising:
   a. directing sludge to an autothermal thermophilic aerobic digester (ATAD) and subjecting the sludge to an ATAD digestion process;
   b. directing the ATAD digested sludge to a mesophilic aerator and subjecting the digested sludge to mesophilic aeration;
   c. after the ATAD sludge has been subjected to mesophilic aeration, mixing with the sludge a metal salt selected from the group consisting of ferric chloride, ferrous chloride, and alum;

d. mixing a cationic polymer with the sludge and wherein the metal salt along with the cationic polymer forms conditioned sludge; and e. directing the conditioned sludge to a dewatering station and dewatering the sludge.

2. The method of claim 1 including the step of nitrfying ammonia nitrogen present in the sludge in the mesophilic aerator.

3. The method of claim 1 wherein the ATAD digestion process produces a digested sludge having concentrations of COD, protein, and polysaccharides, and wherein adding the metal salt to the ATAD digested sludge tends to reduce the concentration of COD, protein and polysaccharides within solution.

4. The method of claim 1 including subjecting the sludge to a temperature of approximately 50°–70° C. during the ATAD digestion process.

5. The method of claim 4 including subjecting the ATAD sludge to a temperature of 20°–40° C. during mesophilic aeration.

6. A method for digesting, conditioning and dewaterlng sludge comprising:

a) subjecting the sludge to autothermal thermophilic aerobic digestion (ATAD) and in the process producing concentrations of COD Including protein and polysaccharides;

b) directing the ATAD sludge to a mesophilic aerator and subjecting the ATAD digested sludge to mesophilic aeration;

c) treating the ATAD digested sludge and COD by mixing a metal salt with the ATAD sludge wherein the metal salt is based on iron or aluminum and wherein the metal salt effectively drives quantities of COD from solution and thereby decreases the polymer demand for acceptable dewatering of the sludge, and wherein the metal salt is mixed with the sludge after the sludge has been subjected to mesophilic aeration;

d) mixing at least one cationic polymer with the digested sludge to promote flocculation and dewatering;

e) directing the conditioned sludge to a dewatering station and dewatering sludge; and f) wherein the aeration is achieved through a mesophilic aerator and the ATAD digested sludge is aerated therein for a period of approximately 10–15 days at a temperature of approximately 20–40° C.

7. The method of claim 6 including the step of aerating the ATAD digested sludge.

8. The method of claim 7 wherein the metal salt is mixed with the sludge after the sludge has been aerated.

9. The method of claim 7 wherein the aeration is achieved through a mesophilic aerator and the ATAD digested sludge is aerated therein for a period of approximately 10–15 days at a temperature of approximately 20–40° C.

10. The method of claim 6 wherein the metal salt is selected from the group consisting of ferric chloride, ferrous chloride and alum.

11. The method of claim 10 wherein the metal salt is mixed with the sludge at the rate of approximately 0.02–0.20 lb of iron or iron equivalent per pound of dry solids.

12. The method of claim 11 wherein the polymer is mixed with the sludge at the rate of approximately 15–25 lbs per dry ton of solids.

13. The method of claim 6 including subjecting the sludge to a temperature of 50°–70° C. during the ATAD digestive process.

* * * * *